United States Patent
Lu et al.

(10) Patent No.: US 9,727,172 B2
(45) Date of Patent: Aug. 8, 2017

(54) METHOD FOR DEFINING EFFECTIVE PIXELS IN IMAGE SENSING ARRAY

(71) Applicant: Wistron Corporation, New Taipei (TW)

(72) Inventors: Kuo-Hsien Lu, New Taipei (TW); Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 142 days.

(21) Appl. No.: 14/685,612

(22) Filed: Apr. 14, 2015

(65) Prior Publication Data

US 2016/0188118 A1    Jun. 30, 2016

(30) Foreign Application Priority Data

Dec. 29, 2014  (TW) .............................. 103146055 A

(51) Int. Cl.
    *G06F 3/042*    (2006.01)
(52) U.S. Cl.
    CPC .................................. *G06F 3/0421* (2013.01)
(58) Field of Classification Search
    CPC ...... G06F 3/042; G06F 3/0421; G06F 3/0428; G06F 3/0304; G06F 2203/04109
    See application file for complete search history.

(56) References Cited

U.S. PATENT DOCUMENTS

| 2009/0213093 A1* | 8/2009 | Bridger | G06F 3/0421 345/175 |
| 2010/0079412 A1* | 4/2010 | Chiang | G06F 3/0428 345/175 |
| 2012/0327029 A1* | 12/2012 | Martin | G06F 3/0421 345/175 |
| 2013/0127785 A1* | 5/2013 | Wang | G06F 3/042 345/175 |

* cited by examiner

*Primary Examiner* — Lisa Landis
(74) *Attorney, Agent, or Firm* — Jianq Chyun IP Office

(57) ABSTRACT

A method for defining effective pixels in an image sensing array of a light-shading optical touch system is proposed. First, light-shading objects are disposed at three end points of a touch panel, and a shaded image is generated by an image sensing array. Light-shading object pixels corresponding to the light-shading objects are obtained from the shaded image thereafter. Next, the light-shading objects are removed from the touch panel, and a non-shaded image is generated by the image sensing array. Three pixel columns corresponding to the end points are obtained from the non-shaded image, and a pixel with maximum intensity is obtained from each of the three pixel columns. Interpolated pixels between the three brightest pixels are obtained through interpolation from the non-shaded image. Image sensing pixels corresponding to the three brightest pixels and the interpolated pixels in the image sensing array are defined as effective pixels.

12 Claims, 5 Drawing Sheets

METHOD FOR DEFINING EFFECTIVE PIXELS IN IMAGE SENSING ARRAY

CROSS-REFERENCE TO RELATED APPLICATION

This application claims the priority benefit of Taiwan application serial no. 103146055, filed on Dec. 29, 2014. The entirety of the above-mentioned patent application is hereby incorporated by reference herein and made a part of this specification.

BACKGROUND OF THE INVENTION

1. Field of the Invention

The present invention generally relates to an image sensing array of an optical touch system, in particular, to a method for defining effective pixels in an image sensing array of an optical touch system.

2. Description of Related Art

Along with rapid development of technology, a touch-sensing electronic product has become a main trend of the market. Among resistive, capacitive, and back projection touch screens being used in the past, the capacitive touch screen provides the most satisfactory performance, and yet it requires the most expensive cost. Moreover, the cost of the capacitive touch screen increases with its screen size, and its application is thus limited. An optical touch screen that utilizes an optical lens to detect a touched position has been proposed as an alternative to the capacitive touch screen. The optical touch technology has various advantages such as low cost and high accuracy, which is more competitive in the market. It thus has also become an option for a large-sized touch screen.

In general, the optical touch screen performs sensing by using a plurality of optical sensing modules including light sources and image sensing arrays at edges of the screen after the light provided by the light sources are reflected back to the image sensing arrays from a light-reflecting object. The optical touch screen could be categorized into an interruptive architecture and a reflective architecture.

In an interruptive optical touch technology, reflective strips or light-emitting strips are configured at the periphery of the touch area. When a touch object is located on the display surface and interrupts a part of the reflected or emitted light, an optical sensor would sense shaded areas caused thereby, and the location of the touch object may be calculated accordingly. In a reflective optical touch technology, reflective substance on the touch object or to project light is added on a touch object. When the touch object is located on the display surface, an optical sensor would sense the light reflected from the touch object, and the location of the touch object may be calculated accordingly.

Therefore, in the optical touch technology, in order to comply with the fundamental principles of the optical touch technology, it is important to make sure that the light reflected back from a light-reflecting object is able to be received by the optical sensor. However, it would be difficult to maintain an even surface for a large-sized touch screen, and the light may be reflected to other areas which are not able to be received by the optical sensor. A conventional line sensor may be replaced by an area sensor with a larger light receiving range to solve such a problem. However, all signals received by an image sensing array of the area sensor would form a two-dimensional signal array. During touch detection, the signal received by each of the image sensing pixels in the image sensing array is required to be analyzed so as to obtain a pixel with maximum intensity in each horizontal pixel and thereby obtain the high reflection signals for touch detection. Thus, as compared with the line sensor, the area sensor may take much more time on signal detection.

The existing technique has been extended to define a pixel among each horizontal pixel of the image sensing array of the area sensor that is able to obtain a highest reflection signal for touch detection at a factory production stage. Take a 1600×512 image sensing array as an example. The existing technique takes 1600×512 times of computation to determine the sensing pixel in each horizontal pixel which is able to receive a signal with high intensity. The production may be affected due to a large amount of computation.

SUMMARY OF THE INVENTION

Accordingly, the present invention is directed to a method for defining effect pixels in an image sensing array, which not only provides accurate touch detection during touch operation, but also speeds up the production of the touch panel at a product manufacturing stage.

The present invention is directed to a method for defining effective pixels in an image sensing array, adapted to an optical touch system having at least one optical sensing module, a touch panel, and a backlight generator. Each of the at least one optical sensing module includes a light source and an image sensing array, where the light source and the image sensing array are disposed at a reference endpoint of the touch panel, the backlight generator is disposed at an edge of the touch panel, and the light source provides a sensing light beam. The method includes the following steps. First, a light-shading object is disposed at each of a first endpoint, a second endpoint, and a third endpoint of the touch panel, and backlight generated by the backlight generator due to the sensing light beam incident thereto is received by using the image sensing array so as to generate a shaded image, where the reference endpoint and the second endpoint are approximately diagonally opposite one another, and the first endpoint and the third endpoint are approximately diagonally opposite one another. A plurality of light-shading object pixels corresponding to the light-shading objects are obtained from the shaded image. Next, the light-shading objects are removed from the touch panel, and the backlight generated by the backlight generator is received by using the image sensing array so as to generate a non-shaded image. A first pixel column, a second pixel column, and a third pixel column respectively corresponding to the first endpoint, the second endpoint, and the third endpoint are obtained from the non-shaded image according to coordinates of the light-shading object pixels. A first pixel, a second pixel, and a third pixel with maximum intensity are respectively obtained from the first pixel column, the second pixel column, and the third pixel column. Then, a plurality of first interpolated pixels between the first pixel and the second pixel as well as a plurality of second interpolated pixels between the second pixel and the third pixel are obtained through an interpolation method, and a plurality of image sensing pixels in the image sensing array corresponding to the first pixel, the second pixel, the third pixel, the first interpolated pixels, and the second interpolated pixels are defined as the effective pixels.

The present invention is directed to another method for defining effective pixels in an image sensing array, adapted to an optical touch system having at least one optical sensing module and a touch panel. Each of the at least one optical sensing module includes a light source and an image sensing array, where the light source and the image sensing array are disposed at a reference endpoint of the touch panel, and the light source provides a sensing light beam. The method includes the following steps. A light-reflecting object is disposed at each of a first endpoint, a second endpoint, and a third endpoint of the touch panel, and the sensing light beam reflected back from the light-reflecting object is received by using the image sensing array so as to generate a reflected image, where the reference endpoint and the second endpoint are approximately diagonally opposite one another, and the first endpoint and the third endpoint are approximately diagonally opposite one another. A plurality of light-reflecting object pixels corresponding to the light-reflecting objects are obtained from the reflected image. Next, a first pixel column, a second pixel column, and a third pixel column respectively corresponding to the first endpoint, the second endpoint, and the third endpoint are obtained from the reflected image according to coordinates of the light-reflecting object pixels. A first pixel, a second pixel, and a third pixel with maximum intensity are respectively obtained from the first pixel column, the second pixel column, and the third pixel column. A plurality of first interpolated pixels between the first pixel and the second pixel as well as a plurality of second interpolated pixels between the second pixel and the third pixel are obtained through an interpolation method, and a plurality of image sensing pixels in the image sensing array corresponding to the first pixel, the second pixel, the third pixel, the first interpolated pixels, and the second interpolated pixels are defined as the effective pixels.

In view of the foregoing, in the method for defining effective pixels in an image sensing array proposed in the invention, before an optical touch system leaves the factory, endpoints of a touch panel are identified through disposing light-shading objects or light-reflecting objects thereon. Image sensing pixels in the image sensing array that receive a maximum light signal of the sensing light beam through the endpoints are obtained thereafter, and image sensing pixels in the image sensing array that receive the maximum light signal of the sensing light beam through other positions are further obtained through interpolation, where all the aforesaid image sensing pixels are defined as the effective pixels. The proposed method may not only provide accurate touch detection during touch operation, but also speed up the production of the touch panel at a product manufacturing stage.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
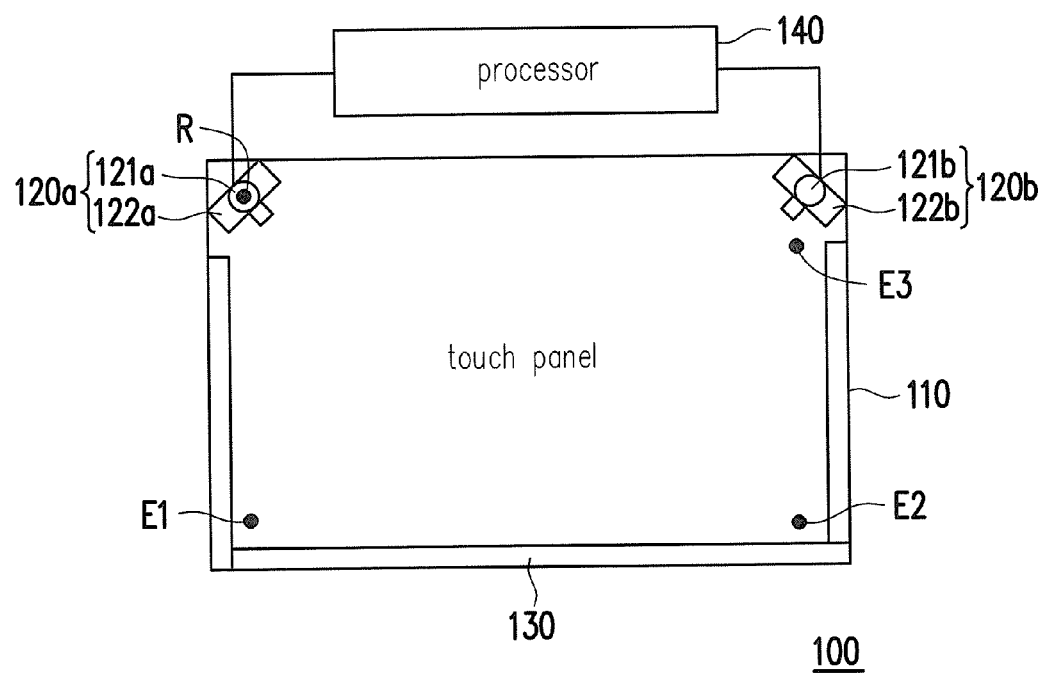
FIG. 1 illustrates a schematic diagram of an architecture of an optical touch system according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 illustrates a schematic diagram of an architecture of an optical touch system according to an embodiment of the invention, where such optical touch system has an interruptive optical touch system architecture.

Referring to FIG. 1, an optical touch system 100 includes a touch panel 110, two optical sensing modules 120a and 120b, a backlight generator 130, and a processor 140 in the present embodiment.

The touch panel 110 may be, for example, a touch panel of a display integrated with touch detection components. Such display may be, for example, a liquid crystal display (LCD), a light-emitting diode (LED) display, a field emission display (FED), or other types of displays, and yet the invention is not limited thereto. The touch panel 110 may also be an external touch detection component such as an electronic whiteboard on a writing plane or a projection plane. The periphery of the touch panel 110 is configured with the backlight generator 130 which may be a reflective strip or a light-emitting strip. A reflective strip would be illustrated as the backlight generator 130 in the following embodiments.

The optical sensing modules 120a and 120b are respectively disposed at a top-left corner and a top-right corner of the touch panel 110, and include light sources 121a and 121b as well as image sensing arrays 122a and 122b. The light sources 121a and 121b may be light-emitting diodes and configured to provide sensing light beams. The image sensing arrays 122a and 122b may be, for example, sensing elements of area sensors, where the sensing elements may be, for example, charge coupled devices (CCD), complementary metal-oxide semiconductor (CMOS) elements, and yet the invention is not limited thereto. The image sensing arrays 122a and 122b are configured to sense intensity of light incident onto the optical sensing modules 120a and 120b, and respectively generate intensity images thereafter.

The processor 140 may be, for example, a central processing unit (CPU), a microprocessor, a digital signal processor (DSP), application specific integrated circuits (ASIC), or the likes. The processor 140 is coupled to the optical sensing modules 120a and 120b and configured to receive and analyze the intensity images generated by the image sensing arrays 122a and 122b so as to define effective pixels in the image sensing arrays 122a and 122b.

Figure 2:
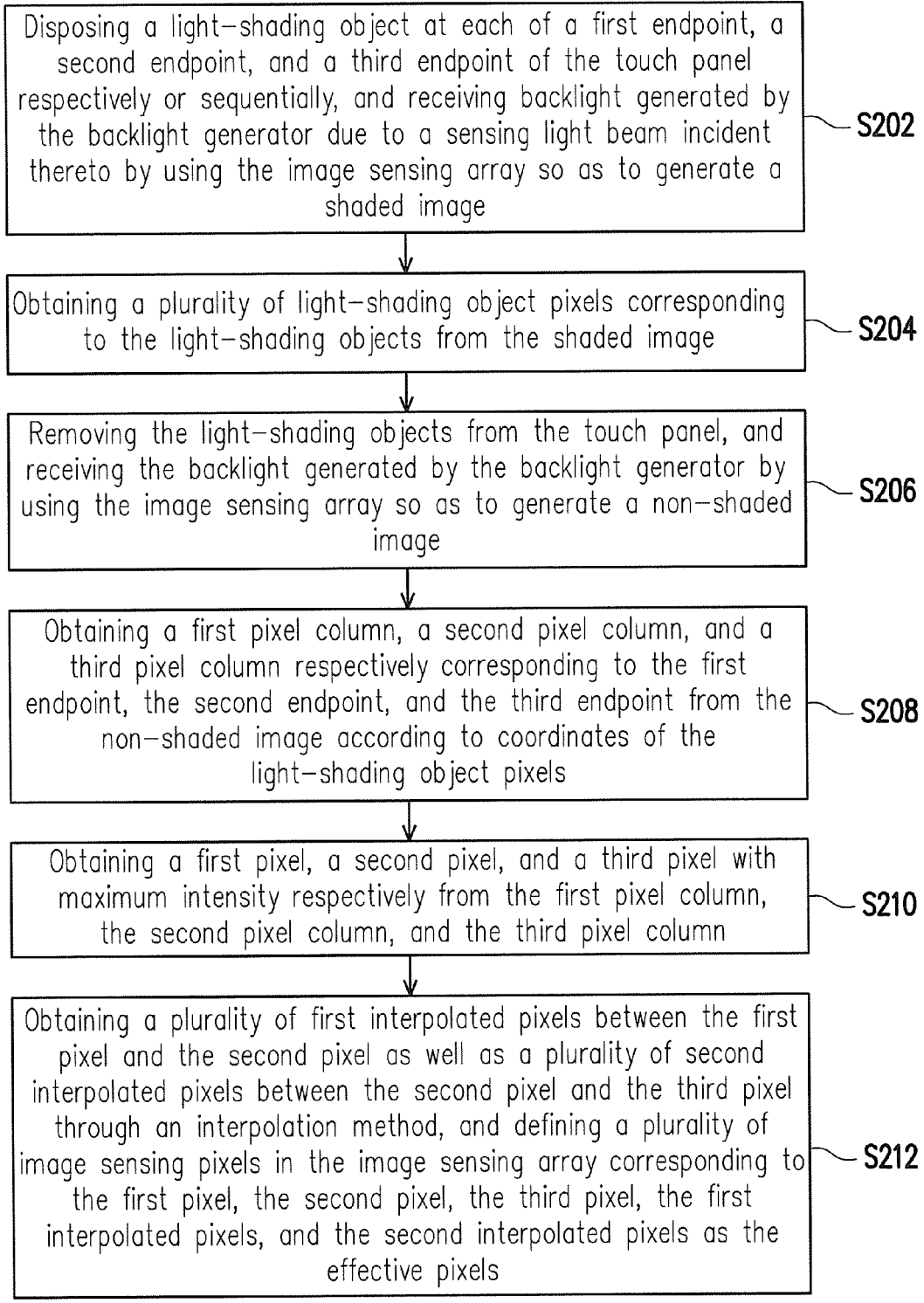
FIG. 2 illustrates a flowchart of a method for defining effective pixels in an image sensing array according to an embodiment of the invention.

FIG. 2 illustrates a flowchart of a method for defining effective pixels in an image sensing array according to an embodiment of the invention, and the method in FIG. 2 may be adapted to define effective pixels in the image sensing arrays 122a and 122b. For simplicity, only the image sensing array 122a would be illustrated hereafter. A position on the touch panel 110 at which the image sensing array 122a is disposed is defined as a reference endpoint R.

Referring to both FIG. 1 and FIG. 2, a light-shading object is disposed at each of a first endpoint E1, a second endpoint E2, and a third endpoint E3 respectively or sequentially, and backlight reflected back from the backlight generator 130 due to a sensing light beam incident thereto is received by using the image sensing array 122a so as to generate a shaded image (Step S202). (For the embodiment that a light-emitting strip is illustrated as the backlight generator 130, backlight guided by the light-emitting strip due to a sensing light beam incident thereto is received.) In the present embodiment, the first endpoint E1, the second endpoint E2, and the third endpoint E3 are respectively located in corner areas of the touch panel 110, where the reference endpoint R and the second endpoint E2 are approximately diagonally opposite one another, and the first endpoint E1 and the third endpoint E3 are approximately diagonally opposite one another. Additionally, each light-shading object is a calibration rod without any reflective material; it may be made of for example, plastic material, and yet the invention is not limited thereto. After the light source 121a is emitted from the light sensing module 120a, it would be reflected back to the light sensing module 120a from the backlight generator 130 and sensed by the image sensing array 122a. A two-dimensional image signal including information of the light-shading objects would be generated thereafter, where such two-dimensional image signal is the aforesaid shaded image.

Next, the processor 140 obtains light-shading object pixels corresponding to the light-shading objects from the shaded image (Step S204). To be specific, the processor 140 may obtain pixels corresponding to the light-shading objects by leveraging a background subtraction algorithm. In such algorithm, a background model is first constructed, and pixel value subtraction is performed between the shaded image and the background model on a one-to-one basis so as to obtain the pixels corresponding to the light-shading objects. Thus, before the light-shading objects are disposed at the first endpoint E1, the second endpoint E2, and the third endpoint E3 of the touch panel 110, the backlight reflected back from the backlight generator 130 may be received by using the image sensing array 122a so as to generate a two-dimensional image signal. Such two-dimensional image signal may be referred to as a first background image hereinafter. In an embodiment, the processor 140 may adjust pixel values of the first background image by considering noises during measurement.

After the processor 140 obtains the first background image and the shaded image, each pixel therein would be compared so as to obtain all pixels corresponding to the light-shading objects. To be specific, the processor 140 may determine whether a difference between the intensity of each of the pixels in the shaded image and that of its corresponding pixel in the first background image exceeds a preset threshold value. If so, the processor 140 may define it as a light-shading object pixel. Since the light-shading objects are disposed at the first endpoint E1, the second endpoint E2, and the third endpoint E3, the pixels corresponding to the light-shading objects in the shaded image are those corresponding to the first endpoint E1, the second endpoint E2, and the third endpoint E3.

Next, the light-shading objects are removed from the touch panel 110, and the backlight reflected back from the backlight generator 130 is received by using the image sensing array 122a so as to generate a non-shaded image (Step S206). The processor 140 obtains a first pixel column, a second pixel column, and a third pixel column respectively corresponding to the first endpoint E1, the second endpoint E2, and the third endpoint E3 from the non-shaded image according to coordinates of the light-shading object pixels (Step S208). To be specific, the non-shaded image is an image that is not blocked by any light-shading object, and thus no shaded region would be presented in the non-shaded image. In the present embodiment, the processor 140 may obtain a horizontal coordinate of each of the light-shading object pixels, and then obtain a plurality of pixel columns with same horizontal coordinates from the non-shaded image, where the pixel columns are the aforesaid first pixel column, second pixel column, and third pixel column and respectively correspond to the first endpoint E1, the second endpoint E2, and the third endpoint E3 of the touch panel. Each vertical coordinate of each of the pixel columns corresponds to a different incident angle of the backlight reflected back from the backlight generator 130 due to the sensing light beam incident thereto.

Figure 3A:
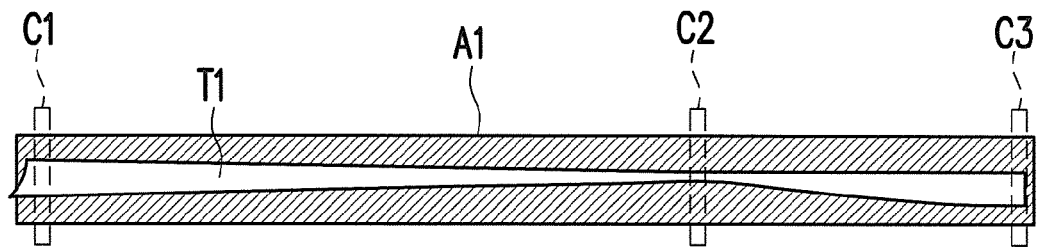
FIG. 3A illustrates a shaded image according to an embodiment of the invention.
Figure 3B:
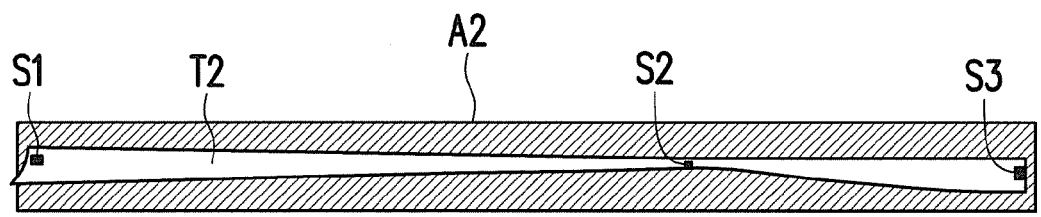
FIG. 3B illustrates a non-shaded image according to an embodiment of the invention.

For example, FIG. 3A and FIG. 3B illustrate a shaded image and a non-shaded image respectively according to an embodiment of the invention.

Referring to both FIG. 3A and FIG. 3B, since the backlight generator 130 is disposed at the periphery of the touch panel 110, a non-shaded image A1 includes a light trace T1 of the backlight reflected back from the backlight generator 130. Since the light-shading object blocks a part of the backlight reflected back from the backlight generator 130, a light trace T2 in a shaded image A2 includes shaded parts S1, S2, and S3 corresponding to the light-shading objects. After the processor 140 obtains pixels of the shaded parts S1, S2, and S3 corresponding to the light-shading objects, pixel columns C1, C2, and C3 would be obtained from the non-shaded image A1, where the pixel columns C1, C2, and C3 are the aforesaid first pixel column, the second pixel column, and the third pixel column.

Revisiting FIG. 2, the processor 140 obtains a first pixel, a second pixel, and a third pixel with maximum intensity respectively from the first pixel column, the second pixel column, and the third pixel column (Step S210). To be specific, the vertical coordinate of each of the pixel columns corresponds to a different incident angle of the backlight reflected back to the image sensing array 122a from the backlight generator 130 due to the sensing light beam incident thereto through the first endpoint E1, the second endpoint E2, and the third endpoint E3. Hence, the pixel with the maximum intensity in each of the first pixel column, the second pixel column, and the third pixel column correspond to image sensing pixels in the image sensing array 122a with a high reflection signal through each of the first endpoint E1, the second endpoint E2, and the third endpoint E3.

After the processor 140 obtains the first pixel, the second pixel, and the third pixel, it obtains first interpolated pixels between the first pixel and the second pixel as well as a plurality of second interpolated pixels between the second pixel and the third pixel through an interpolation method, and defines image sensing pixels in the image sensing array 122a corresponding to the first pixel, the second pixel, the third pixel, the first interpolated pixels, and the second interpolated pixels as the effective pixels (Step S212). To be specific, the first pixel, the second pixel, and the third pixel only correspond to the high reflection signals corresponding to the first endpoint E1, the second endpoint E2, and the third endpoint E3. In the present embodiment, the processor 140 may perform linear interpolation computation on coordinates of the first pixel and the second pixel as well as coordinates of the second pixel and the third pixel so as to obtain other pixels with high reflection signals corresponding to other positions of the touch panel 110.

Figure 3C:
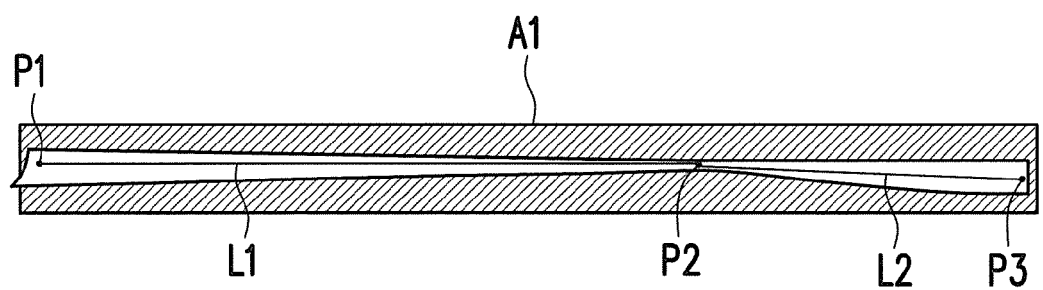
FIG. 3C illustrates a schematic diagram of linear interpolation according to an embodiment of the invention.

For example, FIG. 3C illustrates a schematic diagram of linear interpolation according to an embodiment of the invention.

Referring to FIG. 3C, after the processor 140 obtains a first pixel P1, a second pixel P2, and a third pixel P3 from the non-shaded image A1, it may perform linear interpolation computation according to coordinates of the first pixel P1 and the second pixel P2 so as to obtain a line segment L1, where the line segment L1 are interpolated pixels between the first pixel P1 and the second pixel P2 (i.e. the aforesaid first interpolated pixels). Moreover, the processor 140 may perform linear interpolation computation according to coordinates of the second pixel P2 and the third pixel P3 so as to obtain a line segment L2, where the line segment L2 are interpolated pixels between the second pixel P2 and the third pixel P3 (i.e. the aforesaid second interpolated pixels).

The first pixel P1, the first interpolated pixels corresponding to the line segment L1, the second pixel P2, the second interpolated pixels corresponding to the line segment L2, and the third pixel P3 are presumed to be the pixels with maximum intensity of the backlight received from each position of the touch panel 110, and thus the processor 140 may define the image sensing pixels in the image sensing array 122a corresponding to the aforesaid pixels as the effective pixels. Thereafter, when the user performs touch operation on the optical sensing system 100, an image generated by the backlight reflected from the backlight generator 130 and received by the image sensing array 122a may be transformed to a one-dimensional image signal which is advantageous for touch detection.

Take a 1600×512 image sensing array as an example. While the conventional technique takes 1600×512 times of computation at a factory production stage, the proposed method takes 512×3 times of computation to obtain the first pixel, the second pixel, and the pixel in conjunction with 1600 times of interpolation computation. Hence, the proposed method may speed up the production of the optical touch system 100.

Figure 4:
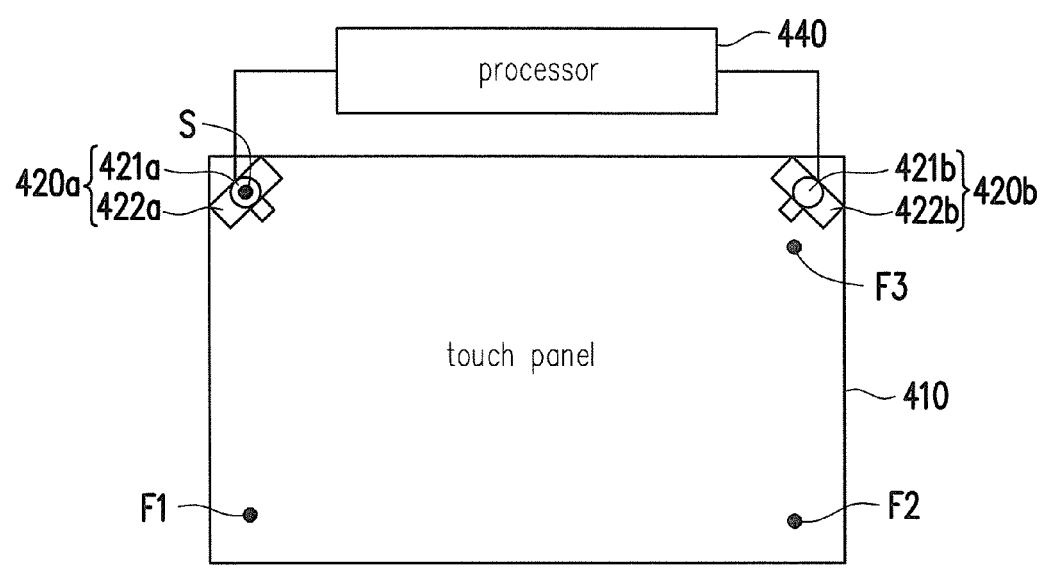
FIG. 4 illustrates a schematic diagram of an architecture of an optical touch system according to an embodiment of the invention.

The method in FIG. 2 is adapted to an interruptive optical touch system. The method illustrated hereafter is adapted to a reflective optical touch system. FIG. 4 illustrates a schematic diagram of an architecture of an optical touch system according to an embodiment of the invention.

Referring to FIG. 4, an optical touch system 400 includes a touch panel 410, two optical sensing modules 420a and 420b, and a processor 440 in the present embodiment.

The touch panel 410, the optical sensing modules 420a and 420b, and the processor 440 are similar to the touch panel 110, the optical sensing modules 120a and 120b, and the processor 140 in FIG. 1. Details on the components of the optical touch system 400 may refer to the related description in the previous paragraphs and may not be repeated herein. The difference between the optical touch system 400 and the optical touch system 100 is that no backlight generator is configured at the periphery of the touch panel 410.

Figure 5:
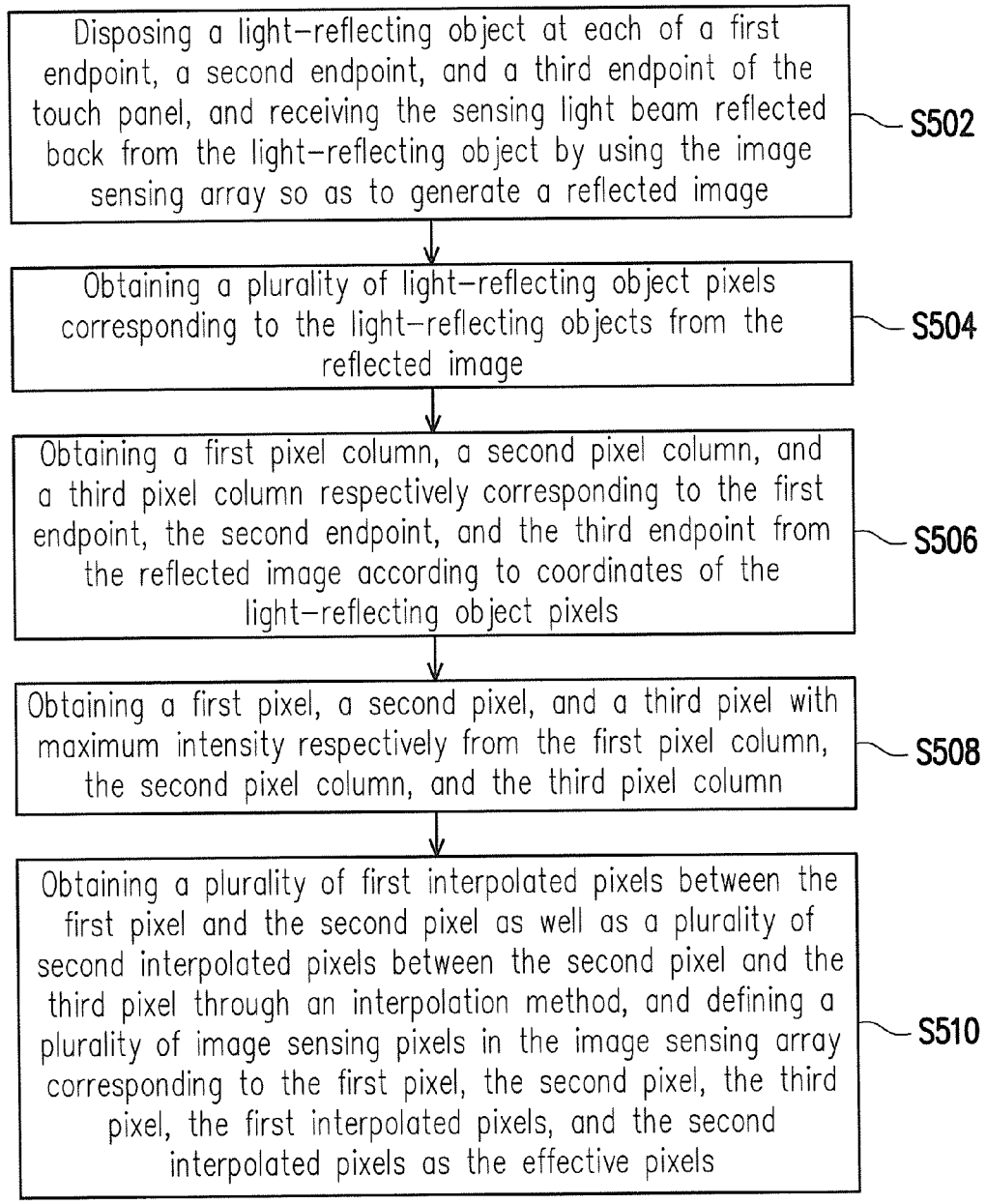
FIG. 5 illustrates a flowchart of a method for defining effective pixels in an image sensing array according to an embodiment of the invention.

FIG. 5 illustrates a flowchart of a method for defining effective pixels in an image sensing array according to an embodiment of the invention, and the method in FIG. 5 may be adapted to define effective pixels in the image sensing arrays 422a and 422b. For simplicity, only the image sensing array 422a would be illustrated hereafter. A position on the touch panel 410 at which the image sensing array 422a is disposed is defined as a reference endpoint S.

Referring to both FIG. 4 and FIG. 5, a light-reflecting object is disposed at each of a first endpoint F1, a second endpoint F2, and a third endpoint F3 respectively, and a sensing light beam reflected back from the light-reflecting objects is received by using the image sensing array 422a so as to generate a reflected image (Step S502). In the present embodiment, the first endpoint F1, the second endpoint F2, and the third endpoint F3 are respectively located in corner areas of the touch panel 410, where the reference endpoint S and the second endpoint F2 are approximately diagonally opposite one another, and the first endpoint F1 and the third endpoint F3 are approximately diagonally opposite one another. Each light-reflecting object may be a calibration rod with a reflective strip, and yet the invention is not limited thereto. After the light source 421a is emitted from the light sensing module 420a, it would be reflected back to the light sensing module 420a and sensed by the image sensing array 422a. A two-dimensional image signal including information of the light-reflecting objects would be generated thereafter, where such two-dimensional image signal is the aforesaid reflected image.

Next, the processor 140 obtains light-reflecting object pixel corresponding to the light-reflecting objects from the shaded image (Step S504). To be specific, the processor 140 may obtain pixels corresponding to the light-reflecting objects by leveraging the background subtraction algorithm as well. Thus, before the light-reflecting objects are disposed at the first endpoint F1, the second endpoint F2, and the third endpoint F3 of the touch panel 410, the sensing light beam may be received by using the image sensing array 422a so as to generate a two-dimensional image signal. Since no light-reflecting object is disposed on the touch panel 410, intensity of the two-dimensional image signal generated by the image sensing array 422a are extremely low. Such two-dimensional image signal may be referred to as a second background image hereinafter. In an embodiment, the processor 140 may adjust pixel values of the second background image by considering noises during measurement.

After the processor 440 obtains the second background image and the reflected image, each pixel therein would be compared so as to obtain all pixels corresponding to the light-reflecting objects. To be specific, the processor 440 may determine whether a difference between the intensity of each of the pixels in the reflected image and that of its corresponding pixel in the second background image exceeds a preset threshold value. If so, the processor 440 may define it as a light-reflecting object pixel. Since the light-reflecting object is disposed at the first endpoint F1, the second endpoint F2, and the third endpoint F3, the pixels corresponding to the light-reflecting objects in the reflected image are the pixels corresponding to the first endpoint F1, the second endpoint F2, and the third endpoint F3.

Next, the processor 440 obtains a first pixel column, a second pixel column, and a third pixel column respectively corresponding to the first endpoint F1, the second endpoint F2, and the third endpoint F3 from the reflected image according to coordinates of the light-reflecting object pixels (Step S506). Distinguished from the step in FIG. 2, after the processor 440 obtains the coordinates of the light-reflecting object pixels, it obtains pixel columns with the same horizontal coordinates from the reflected image, where the pixel columns are the aforesaid first pixel column, second pixel column, and the third pixel column and respectively correspond to the first endpoint F1, the second endpoint F2, and the third endpoint F3. Each vertical coordinate of each of the pixels columns corresponds to a different incident angle of the sensing light beam reflected back from the light-reflecting objects to the image sensing array 422a.

Figure 6:
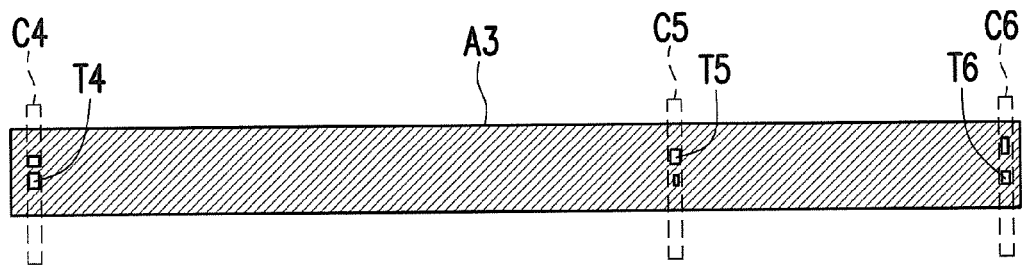
FIG. 6 illustrates a reflected image according to an embodiment of the invention.

For example, FIG. 6 illustrates a reflected image according to an embodiment of the invention.

Referring to FIG. 6, since the light-reflecting object is disposed at each of the first endpoint F1, the second endpoint F2, and the third endpoint F3 of the touch panel 410, a reflected image A3 includes light traces T4, T5, and T6 of the sensing light beam reflected back from the light-reflecting objects. After the processor 440 obtains pixels corresponding to the traces T4, T5, and T6, pixel columns C4, C5, and C6 would be obtained, where the pixel columns C4, C5, and C6 are the aforesaid first pixel column, the second pixel column, and the third pixel column.

Revisiting FIG. 5, the processor 440 obtains a first pixel, a second pixel, and a third pixel with maximum intensity respectively from the first pixel column, the second pixel column, and the third pixel column (Step S508). To be specific, the vertical coordinate of each of the pixel columns corresponds to a different incident angle of the sensing light beam reflected back to the image sensing array 422a from the light-reflecting objects. Hence, the pixel with the maximum intensity in each of the first pixel column, the second pixel column, and the third pixel column correspond to image sensing pixels in the image sensing array 422a with a high reflection signal through each of the first endpoint F1, the second endpoint F2, and the third endpoint F3.

Similarly, after the processor 440 obtains the first pixel, the second pixel, and the third pixel, it obtains first interpolated pixels between the first pixel and the second pixel as well as a plurality of second interpolated pixels between the second pixel and the third pixel via an interpolation method, and defines image sensing pixels corresponding to the first pixel, the second pixel, the third pixel, the first interpolated pixels, and the second interpolated pixels in the image sensing array 422a as the effective pixels (Step S510). Step S510 is similar to Step S212, where its details may be referred to the related description in the previous paragraphs and may not be repeated herein.

The first pixel, the first interpolated pixels, the second pixel, the second interpolated pixels, and the third pixel are presumed to be the pixels with maximum intensity of the sensing light beam received from each position of the touch panel 410, and thus the processor 440 may define the image sensing pixels in the image sensing array 422a corresponding to the aforesaid pixels as the effective pixels. Thereafter, when the user performs touch operation on the optical sensing system 400, an image generated by the sensing light beam reflected from a touch object with reflective material and received by the image sensing array 422a may be transformed to a one-dimensional image signal which is advantageous for touch detection.

In view of the foregoing, in the method for defining effective pixels in an image sensing array proposed in the invention, before an optical touch system leaves the factory, endpoints of a touch panel are identified through disposing light-shading objects or light-reflecting objects thereon. Image sensing pixels in the image sensing array that receive a maximum light signal of the sensing light beam through the endpoints are obtained thereafter, and image sensing pixels in the image sensing array that receive the maximum light signal of the sensing light beam through other positions are further obtained through interpolation, where all the aforesaid image sensing pixels are defined as the effective pixels. The proposed method may not only provide accurate touch detection during touch operation, but also speed up the production of the touch panel at a product manufacturing stage.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for defining effective pixels in an image sensing array, adapted to an optical touch system having at least one optical sensing module, a touch panel, and a backlight generator, wherein each of the at least one optical sensing module comprises a light source and an image sensing array, wherein the light source and the image sensing array are disposed at a reference endpoint of the touch panel, wherein the backlight generator is disposed at an edge of the touch panel, wherein the light source provides a sensing light beam, and wherein the method comprises:
    disposing a light-shading object at each of a first endpoint, a second endpoint, and a third endpoint of the touch panel, and receiving backlight generated by the backlight generator due to the sensing light beam incident thereto by using the image sensing array so as to generate a shaded image, wherein the reference endpoint and the second endpoint are approximately diagonally opposite one another, and wherein the first endpoint and the third endpoint are approximately diagonally opposite one another;
    obtaining a plurality of light-shading object pixels corresponding to the light-shading objects from the shaded image;
    removing the light-shading objects from the touch panel, and receiving the backlight generated by the backlight generator by using the image sensing array so as to generate a non-shaded image;
    obtaining a first pixel column, a second pixel column, and a third pixel column respectively corresponding to the first endpoint, the second endpoint, and the third endpoint from the non-shaded image according to coordinates of the light-shading object pixels;
    obtaining a first pixel, a second pixel, and a third pixel with maximum intensity respectively from the first pixel column, the second pixel column, and the third pixel column; and
    obtaining a plurality of first interpolated pixels between the first pixel and the second pixel as well as a plurality of second interpolated pixels between the second pixel and the third pixel through an interpolation method, and defining a plurality of image sensing pixels in the image sensing array corresponding to the first pixel, the second pixel, the third pixel, the first interpolated pixels, and the second interpolated pixels as the effective pixels.

2. The method according to claim 1, wherein before the step of disposing the light-shading object at each of the first endpoint, the second endpoint, and the third endpoint of the touch panel, the method further comprises:
    receiving the backlight generated by the background generator by using the image sensing array so as to generate a first background image.

3. The method according to claim 2, wherein the step of obtaining the light-shading object pixels corresponding to the light-shading objects from the shaded image comprises:
    for each pixel in the shaded image:

comparing whether a difference between intensity of the pixel and intensity of a corresponding pixel in the first background image exceeds a threshold value; and defining the pixel with the difference between the intensity thereof and the intensity of the corresponding pixel in the first background image exceeding the threshold value as one of the shaded pixels.

4. The method according to claim 1, wherein the step of obtaining the first pixel column, the second pixel column, and the third pixel column respectively corresponding to the first endpoint, the second endpoint, and the third endpoint according to the coordinates of the shaded pixels comprises:

obtaining a horizontal coordinate of each of the light-shading object pixels;

obtaining a plurality of pixel columns with same horizontal coordinates according to the horizontal coordinate of each of the light-shading object pixels; and defining the pixel columns respectively as the first pixel column, the second pixel column, and the third pixel column.

5. The method according to claim 1, wherein the step of obtaining the first interpolated pixels between the first pixel and the second pixel as well as the second interpolated pixels between the second pixel and the third pixel through the interpolation method comprises:

performing linear interpolation computation on coordinates of the first pixel and the second pixel in the non-shaded image so as to obtain the first interpolated pixels; and performing linear interpolation computation on coordinates of the second pixel and the third pixel in the non-shaded image so as to obtain the second interpolated pixels.

6. The method according to claim 1, wherein the backlight generator is a reflective strip, and wherein the image sensing array receives the backlight reflected from the backlight generator due to the sensing light beam incident thereto.

7. The method according to claim 1, wherein the backlight generator is a light-emitting strip, and wherein the image sensing array receives the backlight guided by the backlight generator due to the sensing light beam incident thereto.

8. A method for defining effective pixels in an image sensing array, adapted to an optical touch system having at least one optical sensing module and a touch panel, wherein each of the at least one optical sensing module comprises a light source and an image sensing array, wherein the light source and the image sensing array are disposed at a reference endpoint of the touch panel, wherein the light source provides a sensing light beam, and wherein the method comprises:

disposing a light-reflecting object at each of a first endpoint, a second endpoint, and a third endpoint of the touch panel, and receiving the sensing light beam reflected back from the light-reflecting objects by using the image sensing array so as to generate a reflected image, wherein the reference endpoint and the second endpoint are approximately diagonally opposite one another, and wherein the first endpoint and the third endpoint are approximately diagonally opposite one another;

obtaining a plurality of light-reflecting object pixels corresponding to the light-reflecting objects from the reflected image;

obtaining a first pixel column, a second pixel column, and a third pixel column respectively corresponding to the first endpoint, the second endpoint, and the third endpoint from the reflected image according to coordinates of the light-reflecting object pixels;

obtaining a first pixel, a second pixel, and a third pixel with maximum intensities respectively from the first pixel column, the second pixel column, and the third pixel column; and obtaining a plurality of first interpolated pixels between the first pixel and the second pixel as well as a plurality of second interpolated pixels between the second pixel and the third pixel through an interpolation method, and defining a plurality of image sensing pixels in the image sensing array corresponding to the first pixel, the second pixel, the third pixel, the first interpolated pixels, and the second interpolated pixels as the effective pixels.

9. The method according to claim 8, wherein before the step of disposing the light-reflecting object at each of the first endpoint, the second endpoint, and the third endpoint of the touch panel, the method further comprises:

generating a second background image by using the image sensing array.

10. The method according to claim 9, wherein the step of obtaining the light-reflecting object pixels corresponding to the light-reflecting objects from the reflected image comprises:

for each pixel in the reflected image:
comparing whether a difference between intensity of the pixel and intensity of a corresponding pixel in the second background image exceeds a threshold value; and defining the pixel with the difference between the intensity thereof and the intensity of the corresponding pixel in the first background image exceeding the threshold value as one of the reflected pixels.

11. The method according to claim 10, wherein the step of obtaining the first pixel column, the second pixel column, and the third pixel column respectively corresponding to the first endpoint, the second endpoint, and the third endpoint from the reflected image according to the coordinates of the light-reflecting object pixels comprises:

obtaining a horizontal coordinate of each of the light-reflecting object pixels;

obtaining a plurality of pixel columns with same horizontal coordinates according to the horizontal coordinate of each of the light-reflecting object pixels; and defining the pixel columns respectively as the first pixel column, the second pixel column, and the third pixel column.

12. The method according to claim 10, wherein the step of obtaining the first interpolated pixels between the first pixel and the second pixel as well as the second interpolated pixels between the second pixel and the third pixel through the interpolation method comprises:

performing linear interpolation computation on coordinates of the first pixel and the second pixel in the reflected image so as to obtain the first interpolated pixels; and performing linear interpolation computation on coordinates of the second pixel and the third pixel in the reflected image so as to obtain the second interpolated pixels.

* * * * *